United States Patent
Okahara et al.

(10) Patent No.: US 12,486,896 B2
(45) Date of Patent: Dec. 2, 2025

(54) CONTROL DEVICE FOR TRANSMISSION

(71) Applicants: JATCO Ltd, Fuji (JP); NISSAN MOTOR CO., LTD., Yokohama (JP)

(72) Inventors: Ken Okahara, Atsugi (JP); Yoshinori Yamamura, Yokohama (JP); Seiichirou Takahashi, Isehara (JP); Daisuke Nagae, Hiratsuka (JP); Atsushi Shimada, Tochigi (JP); Satoru Ishii, Yokohama (JP); Yasuhiro Tanaka, Tochigi (JP)

(73) Assignees: JATCO Ltd, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/846,551

(22) PCT Filed: Mar. 14, 2023

(86) PCT No.: PCT/JP2023/009830
§ 371 (c)(1),
(2) Date: Sep. 12, 2024

(87) PCT Pub. No.: WO2023/176825
PCT Pub. Date: Sep. 21, 2023

(65) Prior Publication Data
US 2025/0215971 A1     Jul. 3, 2025

(30) Foreign Application Priority Data
Mar. 18, 2022  (JP) .................... 2022-044002

(51) Int. Cl.
*F16H 61/662*     (2006.01)

(52) U.S. Cl.
CPC . *F16H 61/66272* (2013.01); *F16H 61/66259* (2013.01); *F16H 2061/66277* (2013.01)

(58) Field of Classification Search
CPC ......... F16H 61/66272; F16H 61/66259; F16H 59/18; F16H 59/40; F16H 59/44; F16H 59/72; F16H 61/02; F16H 61/662
(Continued)

(56) References Cited

U.S. PATENT DOCUMENTS 4,522,086 A * 6/1985 Haley ................... B60W 10/04
                                                      474/18
4,628,773 A * 12/1986 Itoh ..................... B60W 10/101
                                                      477/49

(Continued)

FOREIGN PATENT DOCUMENTS

JP     2000-233668 A    8/2000

*Primary Examiner* — Henry Y Liu
(74) *Attorney, Agent, or Firm* — Foley & Lardner LLP

(57) ABSTRACT

A control device for a transmission is used in a transmission that is provided with a continuously variable transmission mechanism including a primary pulley to which a drive force of a drive source mounted on a vehicle is input, a secondary pulley that transmits the drive force of the drive source to a drive wheel, and an endless annular member that is wound around the primary pulley and the secondary pulley. The control device includes a controller configured to perform a gear shift control of changing a transmission gear ratio of the continuously variable transmission mechanism to a high side when rotational oscillation occurs in a rotation member of the continuously variable transmission mechanism and then the rotational oscillation decreases a rotation speed of the rotation member.

19 Claims, 4 Drawing Sheets

(58) Field of Classification Search
USPC .......................................................... 474/28
See application file for complete search history.

(56) References Cited

U.S. PATENT DOCUMENTS

| | | | | |
|---|---|---|---|---|
| 6,086,507 | A * | 7/2000 | Luh ................... | F16H 61/66259 477/48 |
| 6,311,113 | B1 * | 10/2001 | Danz ................. | F16H 61/66259 701/61 |
| 6,342,024 | B1 * | 1/2002 | Walter ................. | F16H 37/021 475/210 |
| 6,385,521 | B1 * | 5/2002 | Ito ........................ | B60W 30/20 701/52 |
| 6,464,603 | B1 * | 10/2002 | Reuschel .......... | F16H 61/66254 474/28 |
| 6,547,692 | B1 * | 4/2003 | Ries-Mueller .... | F16H 61/66272 477/45 |
| 6,702,712 | B2 * | 3/2004 | Reuschel ................ | F16H 59/14 474/70 |
| 6,939,264 | B2 * | 9/2005 | Hommes ........... | F16H 61/66259 701/61 |
| 7,024,290 | B2 * | 4/2006 | Zhao ..................... | B60W 30/20 701/91 |
| 7,258,636 | B2 * | 8/2007 | Reuschel ............. | B60K 31/042 477/46 |
| 7,603,893 | B2 * | 10/2009 | Bitzer ..................... | F16H 9/18 73/115.02 |
| 7,931,551 | B2 * | 4/2011 | Katou ............... | F16H 61/66272 474/18 |
| 8,090,509 | B2 * | 1/2012 | Asaoka ................. | F16H 63/062 477/46 |
| 8,123,658 | B2 * | 2/2012 | Asaoka ................. | B60W 10/08 477/107 |
| 8,221,286 | B2 * | 7/2012 | Van Der Noll ... | F16H 61/66272 477/44 |
| 8,380,405 | B2 * | 2/2013 | Matsuda ............. | F02N 11/0833 477/37 |
| 8,600,634 | B2 * | 12/2013 | Van Der Sluid .. | F16H 61/66272 474/18 |
| 8,684,886 | B2 * | 4/2014 | Roberge .............. | B60W 10/107 477/44 |
| 8,843,287 | B2 * | 9/2014 | Doihara ............ | F16H 61/66272 477/45 |
| 8,892,318 | B2 * | 11/2014 | Doihara ............ | F16H 61/66272 701/55 |
| 8,914,200 | B2 * | 12/2014 | Doihara ............ | F16H 61/66272 477/45 |
| 8,914,201 | B2 * | 12/2014 | Doihara ............ | F16H 61/66272 477/45 |
| 8,914,203 | B2 * | 12/2014 | Kodama ........... | F16H 61/66272 477/45 |
| 8,914,204 | B2 * | 12/2014 | Kodama ........... | F16H 61/66272 477/45 |
| 9,212,742 | B2 * | 12/2015 | Doihara ................ | B60W 10/06 |
| 9,303,762 | B2 * | 4/2016 | Nishida ............. | F16H 61/66272 |
| 9,541,013 | B2 * | 1/2017 | Gauthier ........... | F16H 61/66272 |
| 9,995,389 | B2 * | 6/2018 | Takahashi ......... | F16H 61/66272 |
| 10,215,277 | B2 * | 2/2019 | Takahashi ................. | F16H 9/18 |
| 10,626,970 | B2 * | 4/2020 | Huang ..................... | F16H 9/18 |
| 11,512,717 | B2 * | 11/2022 | Wei ......................... | F15B 1/027 |
| 2002/0132697 | A1 * | 9/2002 | Reuschel ............. | F16H 61/6649 477/37 |
| 2004/0092361 | A1 * | 5/2004 | Hommes ........... | F16H 61/66259 477/46 |
| 2005/0197220 | A1 * | 9/2005 | Reuschel ................ | B60W 10/04 74/2 |
| 2006/0025905 | A1 * | 2/2006 | Zhao ..................... | B60W 20/15 180/65.235 |
| 2006/0166768 | A1 * | 7/2006 | Reuschel .......... | F16H 61/66272 474/8 |
| 2007/0232423 | A1 * | 10/2007 | Katou ............... | F16H 61/66272 474/18 |
| 2008/0182713 | A1 * | 7/2008 | Asaoka .................... | F16H 63/50 477/49 |
| 2008/0183357 | A1 * | 7/2008 | Asaoka ................. | F16H 63/062 701/51 |
| 2010/0198467 | A1 * | 8/2010 | Van Der Noll ... | F16H 61/66272 701/51 |
| 2011/0077828 | A1 * | 3/2011 | Matsuda ............. | F16H 61/0031 701/54 |
| 2011/0237369 | A1 * | 9/2011 | Van Der Sluid .. | F16H 61/66272 474/70 |
| 2011/0277577 | A1 * | 11/2011 | Roberge ................ | B60W 10/06 74/473.1 |
| 2012/0108373 | A1 * | 5/2012 | Doihara ............ | F16H 61/66272 474/28 |
| 2012/0108374 | A1 * | 5/2012 | Doihara ............ | F16H 61/66272 474/28 |
| 2012/0108390 | A1 * | 5/2012 | Doihara ............ | B60W 30/1846 477/46 |
| 2012/0115678 | A1 * | 5/2012 | Doihara ............ | F16H 61/66272 477/46 |
| 2012/0135829 | A1 * | 5/2012 | Doihara ............ | F16H 61/66272 474/28 |
| 2012/0252612 | A1 * | 10/2012 | Kodama ........... | F16H 61/66272 474/69 |
| 2012/0258825 | A1 * | 10/2012 | Kodama ........... | F16H 61/66272 474/69 |
| 2012/0317969 | A1 * | 12/2012 | Nishida ............. | F16H 61/66259 60/468 |
| 2015/0284003 | A1 * | 10/2015 | Gauthier ........... | F16H 61/66272 701/54 |
| 2017/0227121 | A1 * | 8/2017 | Takahashi ........... | B60W 10/107 |
| 2017/0321802 | A1 * | 11/2017 | Takahashi ........... | F16H 61/0021 |
| 2019/0093744 | A1 * | 3/2019 | Huang .................... | F16H 3/724 |
| 2019/0128414 | A1 * | 5/2019 | Mallela ............... | F16H 57/0006 |
| 2019/0211850 | A1 * | 7/2019 | Wei ..................... | F15B 13/0402 |

* cited by examiner

CONTROL DEVICE FOR TRANSMISSION

TECHNICAL FIELD

The present invention relates to transmission control and a program.

BACKGROUND ART

Patent Document 1 discloses a technique of calculating a natural oscillation period of a vehicle corresponding to a load weight of the vehicle based on a change in a rotation speed of an engine, and determining a timing of a control output for the engine or a CVT based on the calculated natural oscillation period. Objects of this technique are to restrain a longitudinal oscillation of a vehicle body during gear shift, and to sufficiently eliminate a longitudinal oscillation of a vehicle and then perform an appropriate oscillation suppression even when the number of passengers or a payload of the vehicle changes.

PRIOR ART DOCUMENT

Patent Document

Patent Document 1: JP2000-233668A

SUMMARY OF INVENTION

In a vehicle including a power transmission path connecting a drive source and drive wheels via a transmission, rotational oscillation occurring in the power transmission path causes longitudinal oscillation of the vehicle. Such rotational oscillation may occur not only during gear shift but also due to various factors unrelated to the gear shift performed by a continuously variable transmission mechanism of the transmission, such as a change in a drive force, that is, factors other than the continuously variable transmission mechanism in the power transmission path. Therefore, it is desired to restrain the rotational oscillation causing the longitudinal oscillation of the vehicle as a further oscillation countermeasure, and to reduce an influence on the drivability such as the deterioration in ride comfort.

The present invention has been made in view of such a problem, and an object thereof is to restrain a rotational oscillation causing a longitudinal oscillation of a vehicle as a further oscillation countermeasure.

A control device for a transmission according to one aspect of the present invention is a control device for a transmission provided with a continuously variable transmission mechanism including a primary pulley to which a drive force of a drive source mounted on a vehicle is input, a secondary pulley that transmits the drive force of the drive source to a drive wheel, and an endless annular member that is wound around the primary pulley and the secondary pulley. The control device includes a controller configured to perform a gear shift control of changing a transmission gear ratio of the continuously variable transmission mechanism to a high side when rotational oscillation occurs in a rotation member of the continuously variable transmission mechanism and then a rotation speed of the rotation member decreases due to the rotational oscillation.

A control device for a transmission according to another aspect of the present invention is a control device for a transmission provided with a continuously variable transmission mechanism including a primary pulley to which a drive force of a drive source mounted on a vehicle is input, a secondary pulley that transmits the drive force of the drive source to a drive wheel, and an endless annular member that is wound around the primary pulley and the secondary pulley. The control device includes a controller configured to perform a gear shift control of changing a transmission gear ratio of the continuously variable transmission mechanism to a low side when rotational oscillation occurs in a rotation member of the continuously variable transmission mechanism and then a rotation speed of the rotation member increases due to the rotational oscillation.

According to other aspects of the present invention, a control method for a transmission and a program corresponding to each of the control devices for a transmission are provided.

According to these aspects, the transmission gear ratio of the continuously variable transmission mechanism is changed to the high side when the rotational oscillation decreases the rotation speed of the rotation member, or the transmission gear ratio of the continuously variable transmission mechanism is changed to the low side when the rotational oscillation increases the rotation speed of the rotation member. As a result, by restraining the decrease or the increase in the rotation speed by an inertia torque generated due to the gear shift of the continuously variable transmission mechanism, it is possible to restrain the rotational oscillation causing the longitudinal oscillation of the vehicle as a further oscillation countermeasure.

DESCRIPTION OF EMBODIMENTS

Hereinafter, an embodiment of the present invention will be described with reference to the accompanying drawings.

Figure 1:
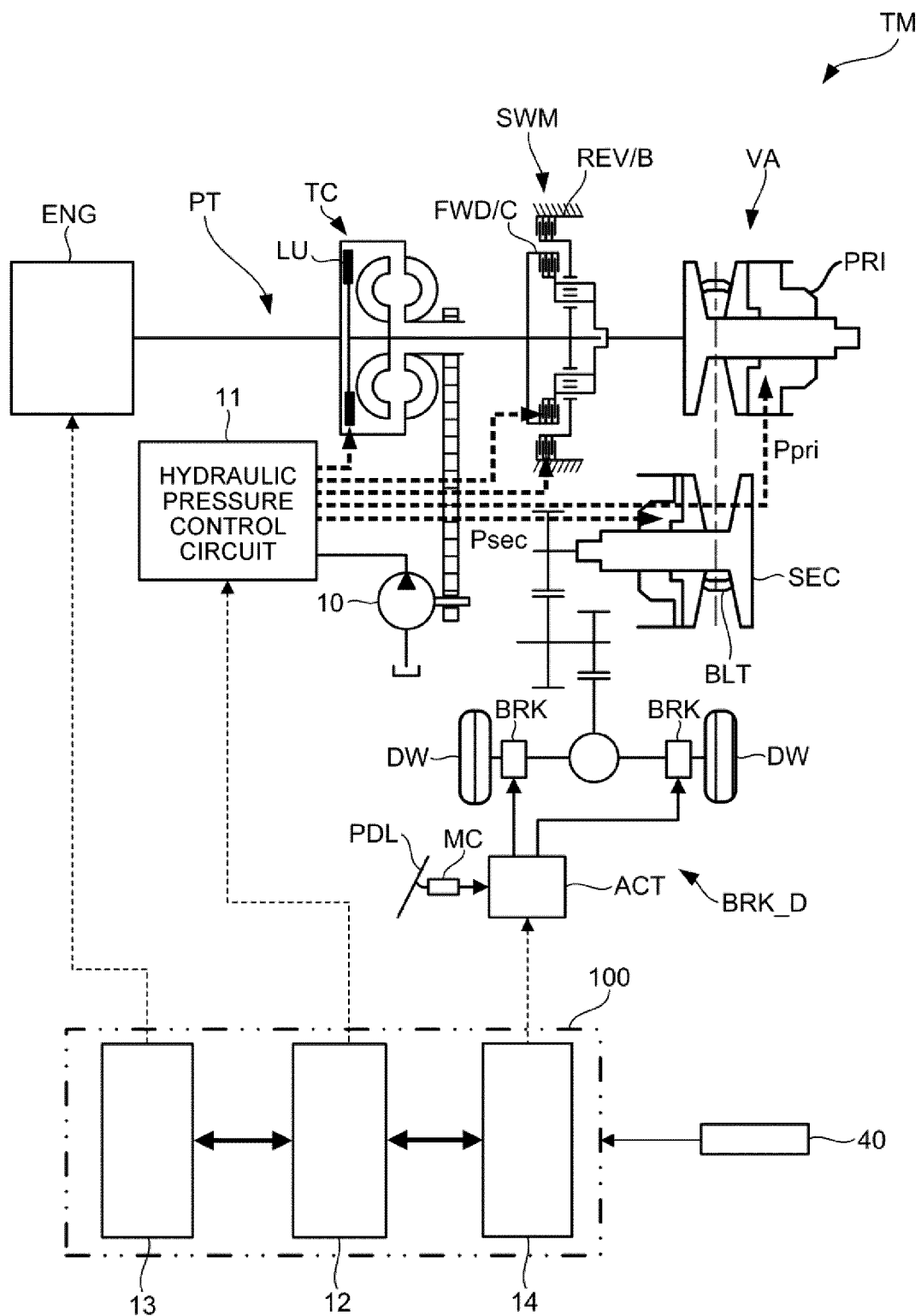
FIG. 1 is a schematic configuration diagram of a vehicle according to an embodiment.

FIG. 1 is a schematic configuration diagram of a vehicle. The vehicle includes an engine ENG, a transmission TM, a brake device BRK_D, and drive wheels DW. The engine ENG constitutes a drive source of the vehicle. Power of the engine ENG is transmitted to the drive wheels DW via the transmission TM. In other words, the transmission TM is provided in a powertrain PT constituting a power transmission path connecting the engine ENG and the drive wheels DW.

The transmission TM is an automatic transmission, and is a belt continuously variable transmission. The transmission TM includes, as ranges, a drive (D) range, a reverse (R) range, a neutral (N) range, a parking (P) range, and the like, and can set any one thereof as a set range. The D range and the R range constitute a traveling range. The D range constitutes a forward range, and the R range constitutes a reverse range. The N range and the P range constitute a non-traveling range.

The transmission TM includes a torque converter TC, a forward and reverse switching mechanism SWM, and a variator VA. The torque converter TC transmits power via a fluid. In the torque converter TC, power transmission efficiency is enhanced by engaging a lock-up clutch LU.

The forward and reverse switching mechanism SWM is provided in a power transmission path connecting the engine ENG and the variator VA. The forward and reverse switching mechanism SWM switches the forward and reverse of the vehicle by switching a rotation direction of input rotation. The forward and reverse switching mechanism SWM includes a forward clutch FWD/C to be engaged when the D range is selected, and a reverse brake REV/B to be engaged when the R range is selected. When the forward clutch FWD/C and the reverse brake REV/B are disengaged, the transmission TM is in a neutral state, that is, a drive force cut-off state.

The variator VA constitutes a continuously variable transmission mechanism including a primary pulley PRI to which a drive force of the engine ENG mounted on the vehicle is input, a secondary pulley SEC that transmits the drive force of the engine ENG to the drive wheels DW, and a belt BLT that is an endless annular member wound around the primary pulley PRI and the secondary pulley SEC. A primary pressure Ppri is supplied to the primary pulley PRI, and a secondary pressure Psec is supplied to the secondary pulley SEC from a hydraulic pressure control circuit 11.

The brake device BRK_D includes brakes BRK, a brake actuator ACT, a brake pedal PDL, and a master cylinder MC. The brakes BRK are provided on the drive wheels DW. A braking force of each brake BRK is controlled by the brake actuator ACT. The brake actuator ACT controls the braking force based on a brake fluid pressure generated by the master cylinder MC converting a pedal force of the brake pedal PDL.

The transmission TM is provided with an oil pump 10. The oil pump 10 is a mechanical oil pump to be driven by the power of the engine ENG. For example, the power of the engine ENG is transmitted to the oil pump 10 via a power transmission mechanism that extracts power from an impeller of the torque converter TC. For example, the power transmission mechanism may be provided to extract the power from an output shaft of the engine ENG. The oil pump 10 pumps oil to the hydraulic pressure control circuit 11. In the hydraulic pressure control circuit 11, a line pressure PL using the oil pump 10 as a hydraulic pressure source, a primary pressure Ppri and the secondary pressure Psec using the line pressure PL as an original pressure, and the like are generated. The transmission TM may be provided with an electric oil pump together with the oil pump 10 or instead of the oil pump 10.

The transmission TM further includes the hydraulic pressure control circuit 11 and a transmission controller 12. The hydraulic pressure control circuit 11 is formed by a plurality of flow paths and a plurality of hydraulic pressure control valves, and adjusts a pressure of the oil supplied from the oil pump 10 and supplies the oil to each part of the transmission TM. The transmission controller 12 is a controller that controls the transmission TM, and is connected to an engine controller 13 for controlling the engine ENG and a brake controller 14 for controlling the brake device BRK_D so as to enable mutual communication therebetween. For example, an output torque signal representing an engine torque Te is input from the engine controller 13 to the transmission controller 12. Information on the brake fluid pressure generated in the brake actuator ACT is input from the brake controller 14 to the transmission controller 12. The transmission controller 12 constitutes a controller provided in a control device of the transmission TM.

Each of the transmission controller 12, the engine controller 13, and the brake controller 14 is implemented by one or a plurality of computers (microcomputers) including a central processing unit (CPU), a read-only memory (ROM), a random access memory (RAM), and an input/output interface (an I/O interface). Each of these controllers 12, 13, and 14 performs a control by executing a program stored in the ROM or the RAM by the CPU. For example, a program stored in a non-transitory storage medium such as a CD-ROM may be used as the program. The engine controller 13 and the brake controller 14 constitute a controller 100. The controller 100 may further include an integrated controller that performs an integrated control of the controllers 12, 13, and 14, and the like.

Signals from a sensor and switch group 40 indicating various sensors and switches are input to the controller 100. The sensor and switch group 40 includes, for example, a vehicle speed sensor that detects a vehicle speed VSP, an accelerator opening sensor that detects an accelerator opening APO, an engine rotation speed sensor that detects a rotation speed Ne of the engine ENG, and a brake sensor that detects a brake fluid pressure.

The sensor and switch group 40 further includes, for example, a primary pressure sensor that detects the primary pressure Ppri, a secondary pressure sensor that detects the secondary pressure Psec, a primary rotation speed sensor that detects a rotation speed Npri as an input side rotation speed of the primary pulley PRI, a secondary rotation speed sensor that detects a rotation speed Nsec as an output side rotation speed of the secondary pulley SEC, a position sensor that detects an operation position of a gear shift lever, and an oil temperature sensor that detects an oil temperature TOIL of the transmission TM. The rotation speed Npri is, for example, a rotation speed of an input shaft of the primary pulley PRI, and the rotation speed Nsec is, for example, a rotation speed of an output shaft of the secondary pulley SEC.

These signals are directly input to the transmission controller 12, or are input to the transmission controller 12 via the engine controller 13 or the like. The transmission controller 12 controls the transmission TM based on these signals. The transmission TM is controlled by controlling the hydraulic pressure control circuit 11 based on these signals. The hydraulic pressure control circuit 11 performs a hydraulic pressure control of the lock-up clutch LU, the forward clutch FWD/C, the reverse brake REV/B, the primary pulley PRI, the secondary pulley SEC, and the like based on instructions from the transmission controller 12.

In the vehicle including the powertrain PT connecting the engine ENG and the drive wheels DW via the transmission TM, rotational oscillation occurring in the powertrain PT causes longitudinal oscillation of the vehicle. Such rotational oscillation occurs not only during gear shift but also due to various factors unrelated to the gear shift performed by the variator VA, such as a change in the drive force, that is, factors other than the variator VA in the powertrain PT. Therefore, it is desired to restrain the rotational oscillation causing the longitudinal oscillation of the vehicle as a further oscillation countermeasure, and to reduce an influence on the drivability such as the deterioration in ride comfort.

In view of such circumstances, in the present embodiment, the transmission controller 12 performs the following oscillation reduction control.

The oscillation reduction control refers to a control of using the variator VA to generate a torque having an opposite phase to the rotational oscillation. Therefore, the oscillation reduction control is performed by a gear shift control of the variator VA. In the oscillation reduction control, the gear shift of the variator VA is performed such that an inertia torque generated by the gear shift of the variator VA becomes the torque having the opposite phase to the rotational oscillation.

The oscillation reduction control refers to a control of restraining the rotational oscillation generated due to the factors other than the variator VA in the powertrain PT. The factors other than the variator VA include, for example, rapid engagement of the lock-up clutch LU, rapid increase and rapid decrease in an input torque Tin of the variator VA, and ON and OFF of an accessory of the engine ENG such as an air conditioner. When these factors occur, a load rapidly changes in the powertrain PT, and thus a drive shaft is twisted. As a result, the drive shaft that attempts to return from a twisted state causes the so-called rotational oscillation in which acceleration and deceleration of a rotation speed of a rotating body (for example, a primary pulley, a secondary pulley, or the like) repeat for a predetermined period. In addition, the factors other than the variator VA include, for example, a brake operation, rattling of power transmission members caused by a rattling portion of the powertrain PT, and the like.

Figure 2:
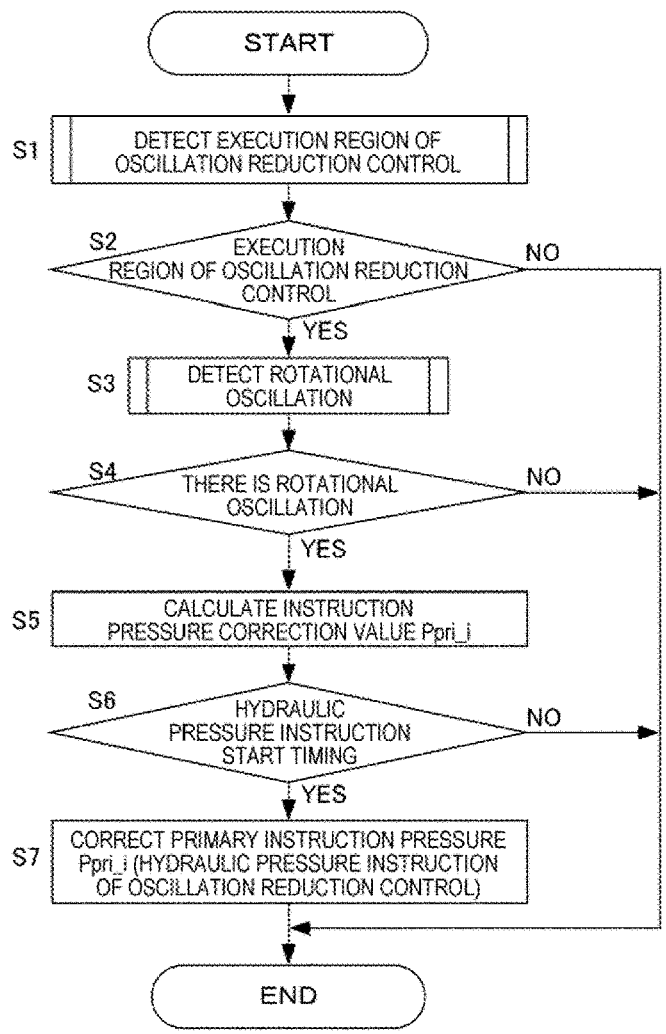
FIG. 2 is a diagram showing an example of an oscillation reduction control by a flowchart.

FIG. 2 is a diagram showing an example of the oscillation reduction control performed by the transmission controller 12 by a flowchart. As shown in FIG. 2, an execution region of the oscillation reduction control is detected in step S1. A detection process of the execution region is performed as shown by the subroutine in FIG. 3.

Figure 3:
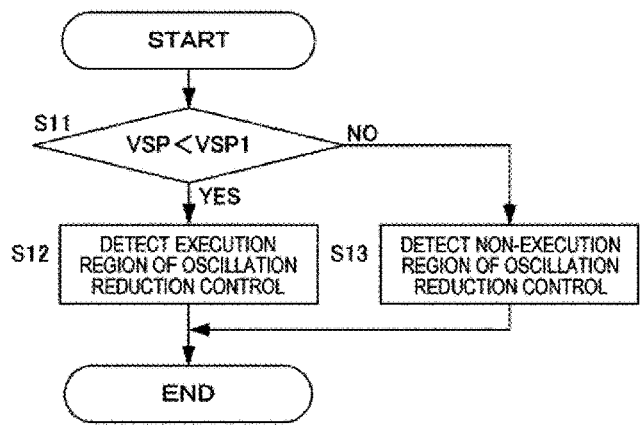
FIG. 3 is a diagram showing an execution region detection process of the oscillation reduction control by a subroutine.

FIG. 3 is a diagram showing the execution region detection process of the oscillation reduction control by the subroutine. In step S11, it is determined whether the vehicle speed VSP is lower than a predetermined vehicle speed VSP1 (whether the vehicle speed VSP is higher than zero and lower than the predetermined vehicle speed VSP1). The predetermined vehicle speed VSP1 is a determination value for determining whether the ride comfort can be deteriorated, and is determined in advance, for example, from the viewpoint of whether the longitudinal oscillation is easily perceived by a driver, that is, from the viewpoint of whether the longitudinal oscillation is noticeable. Therefore, in step S11, it is determined whether the ride comfort can be deteriorated in light of the vehicle speed VSP. The same applies to a predetermined opening APO1, a predetermined transmission gear ratio IP1, and a predetermined oil temperature TOIL1 to be described later. The predetermined vehicle speed VSP1 is set to, for example, a middle vehicle speed (for example, 40 km/h) in a case in which the vehicle speed VSP is classified into low, middle, and high vehicle speeds.

When the vehicle speed VSP is lower than the predetermined vehicle speed VSP1, there is a tendency that there is often some margin in driving of the driver or the driving of the driver is often gentle, and the longitudinal oscillation is easily perceived by the driver. Therefore, if it is determined YES in step S11, it is determined that the ride comfort can be deteriorated.

In step S11, it may be determined whether the accelerator opening APO is smaller than the predetermined opening APO1 (whether the accelerator opening APO is larger than zero and smaller than the predetermined opening APO1). In this case, it is possible to determine whether the ride comfort can be deteriorated in light of the accelerator opening APO. The predetermined opening APO1 is set to, for example, a low opening (for example, 20 deg) in a case in which the accelerator opening APO is classified into low, middle, and high openings. When the accelerator opening APO is lower than the predetermined opening APO1, there is a tendency that the driving is often gentle, and the longitudinal oscillation is easily perceived by the driver. Therefore, in this case, it is determined that the ride comfort can be deteriorated when the accelerator opening APO is smaller than the predetermined opening APO1.

In step S11, it may be determined whether a transmission gear ratio IP is larger than the predetermined transmission gear ratio IP1 (whether the transmission gear ratio IP is larger than the predetermined transmission gear ratio IP1 and is equal to or less than a maximum transmission gear ratio). The transmission gear ratio IP is a value obtained by dividing an input rotation by an output rotation of the variator VA, and in this case, it is possible to determine whether the ride comfort can be deteriorated in light of the transmission gear ratio IP. The predetermined transmission gear ratio IP1 is set to, for example, the transmission gear ratio IP larger than 1. When the transmission gear ratio IP is larger than the predetermined transmission gear ratio IP1, a torque on an output side becomes large, a large load is applied, and thus the drive shaft tends to be twisted easily. Therefore, in this case, the longitudinal oscillation is large, and the longitudinal oscillation is easily perceived by the driver. Accordingly, in this case, it is determined that the ride comfort can be deteriorated when the transmission gear ratio IP is larger than the predetermined transmission gear ratio IP1.

In step S11, it may be determined whether the oil temperature TOIL is higher than the predetermined oil temperature TOIL1 (whether the oil temperature TOIL is equal to or lower than an acceptable highest oil temperature and is higher than the predetermined oil temperature TOIL1). In this case, it is possible to determine whether the rotational oscillation causing the longitudinal oscillation of the vehicle can be restrained in light of the oil temperature TOIL. The predetermined oil temperature TOIL1 is set in advance in consideration of the viscosity of an oil in the torque converter TC. The predetermined oil temperature TOIL1 can be set to, for example, a low temperature of 10° C. or lower, or an extremely low temperature of 0° C. or lower. When the oil temperature TOIL is lower than the predetermined oil temperature TOIL1, the viscosity of the oil is increased by a difference value of the low oil temperature TOIL, and thus it is determined that the responsiveness of the gear shift decreases and the gear shift control as the oscillation reduction control cannot be performed.

In step S11, it may be determined whether any one of the vehicle speed VSP, the accelerator opening APO, the transmission gear ratio IP, and the oil temperature TOIL satisfies the above corresponding determination. In this case, if it is determined YES, it is possible to determine that the ride comfort can be deteriorated. If it is determined YES in step S11, the process proceeds to step S12, and the execution region of the oscillation reduction control is detected. If it is determined NO in step S11, the process proceeds to step S13, and a non-execution region of the oscillation reduction control is detected. The process according to this subroutine ends after step S12 or step S13.

Returning to FIG. 2, in step S2, it is determined, based on a detection result of the execution region, whether the region is the execution region of the oscillation reduction control. If it is determined NO in step S2, the process temporarily ends. If it is determined YES in step S2, the process proceeds to step S3. In step S3, the rotational oscillation is detected. A detection process of the rotational oscillation is performed as shown by the subroutine in FIG. 4.

Figure 4:
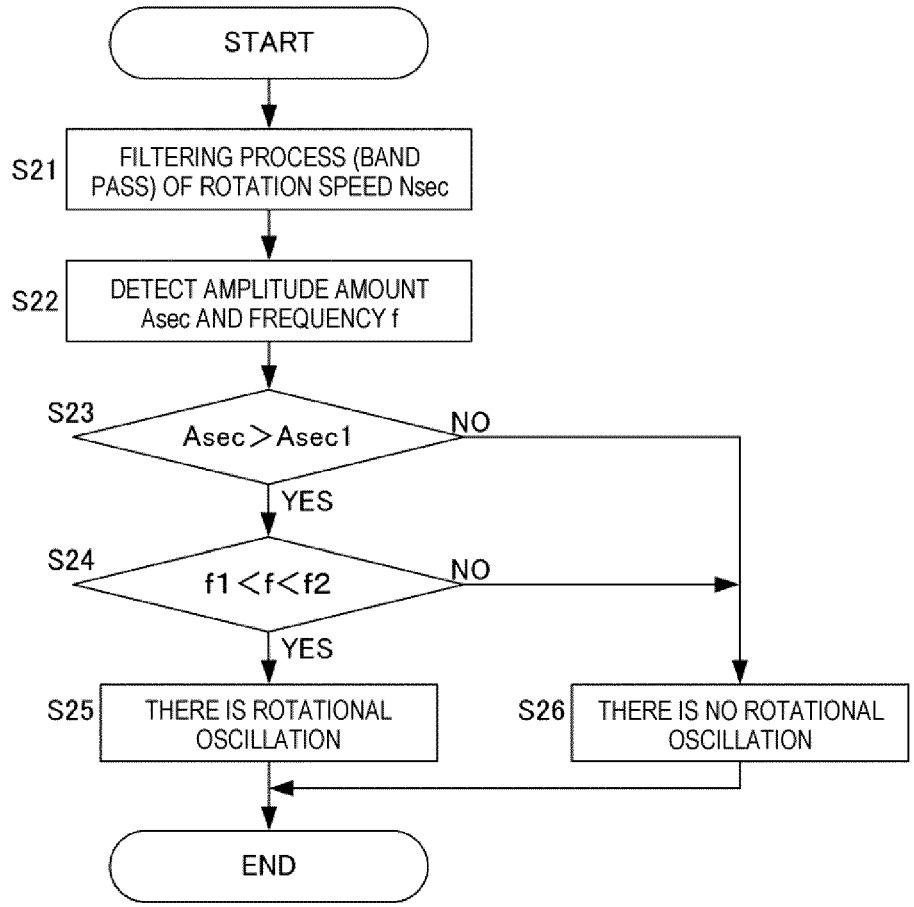
FIG. 4 is a diagram showing a rotational oscillation detection process by a subroutine.

FIG. 4 is a diagram showing the rotational oscillation detection process by the subroutine. In step S21, the rotation speed Nsec detected by the secondary rotation speed sensor is subjected to a filtering process, and a band pass filter is used in the filtering process. In step S21, a rotational oscillation component is extracted from the rotation speed Nsec by the filtering process using the band pass filter.

In step S22, an amplitude amount Asec and a frequency f of the rotation speed Nsec are detected based on an extraction component extracted in step S21. In step S23, it is determined whether the amplitude amount Asec is larger than a predetermined amplitude amount Asec1. The predetermined amplitude amount Asec1 is a determination value for determining whether the amplitude amount Asec reaches an amplitude amount by which the ride comfort is deteriorated, and is set in advance. If it is determined NO in step S23, the process proceeds to step S26, and it is detected that there is no rotational oscillation.

If it is determined YES in step S23, the process proceeds to step S24, and it is determined whether the frequency f is larger than a first predetermined frequency f1 and smaller than a second predetermined frequency f2, that is, whether the frequency f is within a predetermined range. Both the first predetermined frequency f1 and the second predetermined frequency f2 are determination values for determining whether the frequency f is within a frequency band of the rotational oscillation, and are set in advance. If it is determined NO in step S24, the process proceeds to step S26, and it is detected that there is no rotational oscillation. If it is determined YES in step S24, the process proceeds to step S25, and it is detected that there is the rotational oscillation. Accordingly, the rotational oscillation is detected based on the amplitude amount Asec and the frequency f. The process according to this subroutine ends after step S25 or step S26.

Returning to FIG. 2, in step S4, it is determined whether there is the rotational oscillation based on a detection result of the rotational oscillation. If it is determined NO in step S4, the process temporarily ends. If it is determined YES in step S4, the process proceeds to step S5, and an instruction pressure correction value Ppri_i1 is calculated. The instruction pressure correction value Ppri_i1 is a correction value of a primary instruction pressure Ppri_i which is an instruction pressure of the primary pressure Ppri, and refers to a correction value for reflecting the primary pressure Ppri required to restrain the rotational oscillation in the primary instruction pressure Ppri_i. The instruction pressure correction value Ppri_i1 is calculated based on the following Equation 1.

$$Ppri\_i1 = K1 \times K2 \times \sin(ft + \theta\_adj) \quad \text{[Equation 1]}$$

Here, K1 is an oscillation amount of the rotational oscillation, K2 is a hydraulic pressure conversion gain of the oscillation amount K1, f is a frequency of the rotational oscillation, and θ_adj is a time adjustment term for setting the primary pressure Ppri to have an opposite phase to the rotational oscillation. According to Equation 1, the instruction pressure correction value Ppri_i1 is calculated as a sinewave. The instruction pressure correction value Ppri_i1 may be calculated as, for example, a square wave or a triangle wave.

The oscillation amount K1 in Equation 1 is an oscillation amount of the rotational oscillation for a rotation member of the variator VA, and in the present embodiment, the rotation member refers to the secondary pulley SEC. Accordingly, in the present embodiment, the oscillation amount K1 refers to the amplitude amount Asec of the rotation speed Nsec. As can be seen from Equation 1, the instruction pressure correction value Ppri_i1 is calculated to be larger as the amplitude amount Asec increases. Therefore, as the amplitude amount Asec increases, the transmission gear ratio IP changes more largely according to the instruction pressure correction value Ppri_i1. Accordingly, by calculating the instruction pressure correction value Ppri_i1 in this manner, it is possible to restrain the rotational oscillation by increasing the inertia torque as the amplitude amount Asec increases.

The hydraulic pressure conversion gain K2 in Equation 1 is calculated according to a target rotation speed Npri_t of the primary pulley PRI and a target transmission gear ratio IP_t of the variator VA. The target rotation speed Npri_t and the target transmission gear ratio IP_t correspond to the vehicle speed VSP, and the hydraulic pressure conversion gain K2 is set in advance so as to increase as the vehicle speed VSP decreases according to the target rotation speed Npri_t and the target transmission gear ratio IP_t. This is because the gear shift becomes slower as the vehicle speed VSP decreases, and as a result thereof, the inertia torque becomes smaller. Therefore, in the present embodiment, the hydraulic pressure conversion gain K2 is set to be larger as the vehicle speed VSP decreases, and thus a gear shift speed obtained according to the instruction pressure correction value Ppri_i1 is increased to increase the inertia torque. Accordingly, it is possible to appropriately restrain the rotational oscillation in light of the vehicle speed VSP.

The hydraulic pressure conversion gain K2 is further calculated according to the frequency f. The hydraulic pressure conversion gain K2 is calculated to be larger as the frequency f becomes higher. Accordingly, the gear shift speed of the variator VA obtained according to the instruction pressure correction value Ppri_i1 becomes higher as the frequency f becomes higher, and thus a phase of the primary pressure Ppri in which the instruction pressure correction value Ppri_i1 is reflected can be matched with a phase of the rotation speed Nsec that varies depending on the rotational oscillation. The hydraulic pressure conversion gain K2 can be set in advance according to the frequency f.

The frequency f in Equation 1 is a frequency unique to the powertrain PT, and is set in advance according to the transmission gear ratio IP of the variator VA. The frequency f may be further set according to, for example, a load weight of the vehicle.

The time adjustment term θ_adj in Equation 1 is an adjustment term for setting the primary pressure Ppri to have the opposite phase to the rotational oscillation. The time adjustment term θ_adj is calculated such that the primary pressure Ppri, which is an actual pressure, has the opposite phase to the rotational oscillation by correcting the primary instruction pressure Ppri_i at a hydraulic pressure instruction start timing to be described later. The time adjustment term θ_adj is calculated according to the target rotation speed Npri_t and the target transmission gear ratio IP_t. This is because the gear shift speed of the variator VA changes according to the vehicle speed VSP, and as a result thereof, a timing for setting the primary pressure Ppri to have the opposite phase to the rotational oscillation also changes according to the vehicle speed VSP. The time adjustment term θ_adj can be set in advance according to the target rotation speed Npri_t and the target transmission gear ratio IP_t.

After the instruction pressure correction value Ppri_i1 is calculated, the process proceeds to step S6, and it is determined whether the timing is the hydraulic pressure instruction start timing. The hydraulic pressure instruction start timing is a start timing of a hydraulic pressure instruction based on the primary instruction pressure Ppri_i in which the instruction pressure correction value Ppri_i1 is reflected, and refers to a timing at which the primary pressure Ppri, which is an actual pressure, has the opposite phase to the rotational oscillation. Regarding the hydraulic pressure instruction start timing, a response delay required for the primary pressure Ppri, which is an actual pressure, to change according to the primary instruction pressure Ppri_i is taken into consideration in advance.

The hydraulic pressure instruction based on the primary instruction pressure Ppri i in which the instruction pressure correction value Ppri_i1 is reflected can be performed by correcting the primary instruction pressure Ppri_i using the instruction pressure correction value Ppri_i1. Accordingly, in step S6, in other words, it is determined whether the timing is a timing of correcting the primary instruction pressure Ppri_i using the instruction pressure correction value Ppri_i1. The determination in step S6 can be performed based on a rotational oscillation extraction component which is the extraction component extracted according to the rotational oscillation in step S21. If it is determined NO in step S6, the process ends temporarily, and if it is determined YES in step S6, the process proceeds to step S7.

In step S7, the primary instruction pressure Ppri_i is corrected. The primary instruction pressure Ppri_i is corrected by adding the instruction pressure correction value Ppri_i1 to the primary instruction pressure Ppri_i. Accordingly, the primary pressure Ppri is controlled to the corrected primary instruction pressure Ppri_i and has the opposite phase to the rotational oscillation, and as a result thereof, the inertia torque is generated in a direction in which the rotational oscillation is restrained, and thus the rotational oscillation is restrained. After step S7, the process temporarily ends.

Figure 5:
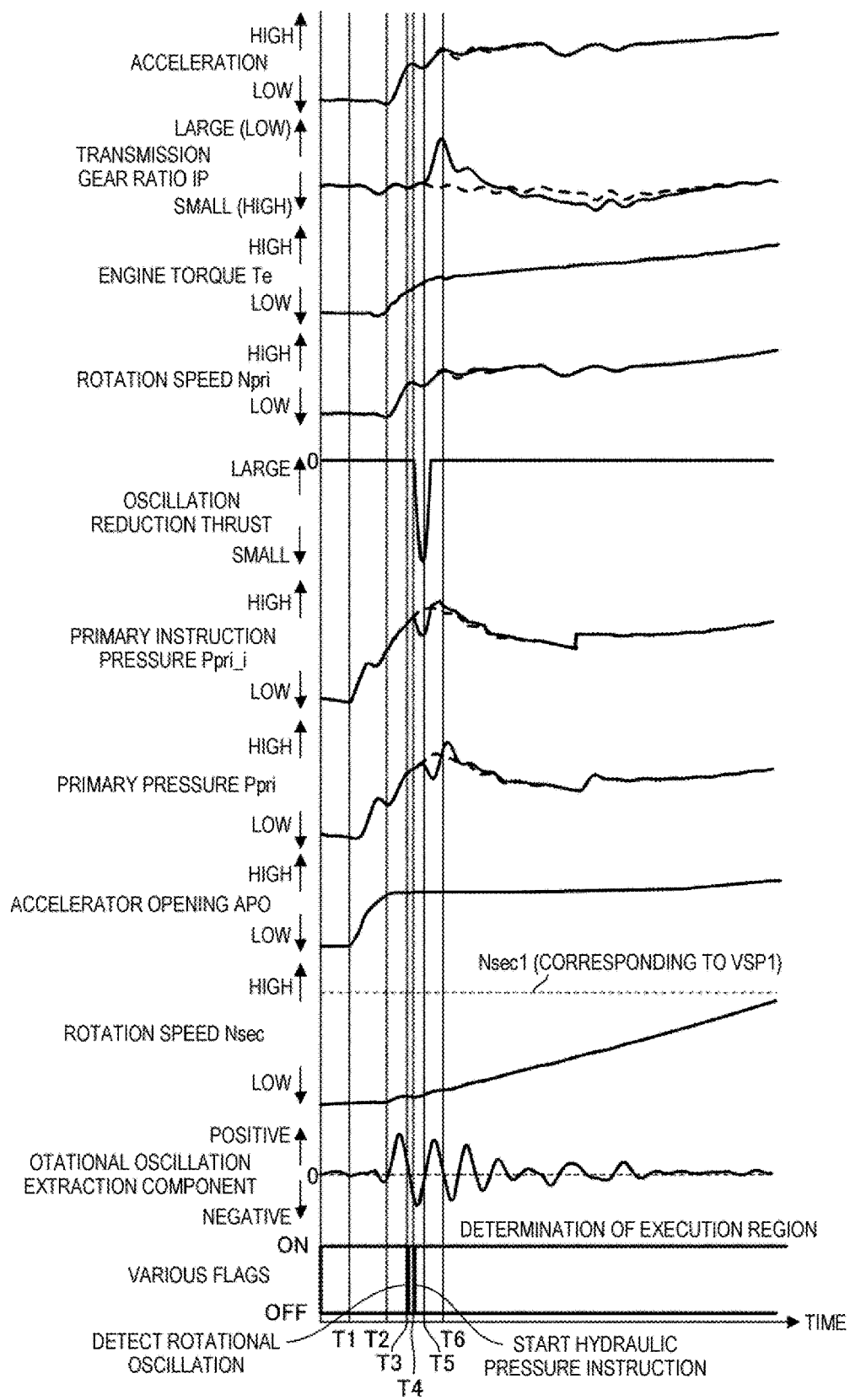
FIG. 5 is a diagram showing an example of a timing chart according to the embodiment.

FIG. 5 is a diagram showing an example of a timing chart corresponding to the flowchart shown in FIG. 2. A dashed line indicates a case of a comparative example in which the oscillation reduction control is not performed. At a timing T1, the accelerator opening APO starts to increase, and at a timing T2, the accelerator opening APO becomes substantially constant. The primary instruction pressure Ppri_i increases as the accelerator opening APO increases, and the primary pressure Ppri also increases accordingly. An acceleration, the engine torque Te, the rotation speed Npri, and the rotation speed Nsec start to increase at the timing T2 in accordance with the increase in the accelerator opening APO, and the acceleration is started.

At the time of starting of the acceleration, the drive shaft is twisted, and the drive shaft attempts to return from the twisted state. Therefore, the rotational oscillation occurs in the powertrain PT, and an amplitude of the rotational oscillation extraction component from the rotation speed Nsec increases. As a result, at a timing T3, the rotational oscillation extraction component that is larger than the predetermined amplitude amount Asec1 and is in the frequency band of the rotational oscillation is detected, and a rotational oscillation detection flag is ON. Therefore, the instruction pressure correction value Ppri_i1 is calculated, and when the hydraulic pressure instruction start timing comes at a timing T4, a hydraulic pressure instruction start flag is ON.

At the timing T4, the primary instruction pressure Ppri_i is corrected by the instruction pressure correction value Ppri_i1. An oscillation reduction thrust indicates a piston thrust of the primary pulley PRI corresponding to the instruction pressure correction value Ppri_i1. In this example, the primary instruction pressure Ppri_i is decreased by the correction, and as a result thereof, by widening a groove width of the primary pulley PRI and reducing a winding diameter of the belt BLT, the oscillation reduction thrust becomes a negative piston thrust for gear-shifting the variator VA toward a low side. In the comparative example, the oscillation reduction control is not performed, and thus the primary instruction pressure Ppri_i does not particularly decrease at the timing T3.

At a timing T5, the primary pressure Ppri, which is an actual pressure, decreases in accordance with the decrease in the primary instruction pressure Ppri_i. As a result, the transmission gear ratio IP changes toward the low side. The timing T4 is a timing at which the rotational oscillation extraction component changing from a negative side to a positive side becomes zero. The hydraulic pressure instruction start timing at the timing T3 is a timing advanced from such a timing in consideration of the response delay. In the comparative example, at the timing T5, the primary pressure Ppri does not particularly decrease, and the transmission gear ratio IP does not particularly change toward the low side.

The rotational oscillation extraction component becomes positive between the timing T5 and a timing T6. Therefore, during this period, the rotational oscillation acts in a direction in which the rotation speed Nsec is increased, thereby increasing the rotation speed Nsec. At this time, the primary pressure Ppri, which is an actual pressure, decreases according to the corrected primary instruction pressure Ppri_i, and as a result thereof, the transmission gear ratio IP changes toward the low side. In the present embodiment, at this time, the transmission gear ratio IP is changed toward the low side by the oscillation reduction control, and thus the rotational oscillation is restrained by the inertia torque of the variator VA generated in accordance with the change.

The instruction pressure correction value Ppri_i1 is calculated such that the primary pressure Ppri has the opposite phase to the rotational oscillation between the timing T5 and the timing T6. In the oscillation reduction control, when the rotational oscillation extraction component is positive between the timing T5 and the timing T6, the transmission gear ratio IP is changed toward the low side, and thus the transmission gear ratio IP is changed toward the low side after the rotational oscillation increases the rotation speed Nsec and before the rotational oscillation decreases the rotation speed Nsec.

In the oscillation reduction control, the transmission gear ratio IP can be changed toward a high side when the rotational oscillation decreases the rotation speed Nsec. Whether the transmission gear ratio IP is changed toward the low side or changed toward the high side by the oscillation reduction control is determined depending on whether the rotational oscillation extraction component changes from negative to positive or from positive to negative after the hydraulic pressure instruction start timing. That is, in the oscillation reduction control, the variator VA can be gear-shifted to the low side or to the high side depending on a relation between the hydraulic pressure instruction start timing and a waveform of the rotational oscillation extraction component, and thus the hydraulic pressure instruction can be started quickly.

The transmission controller 12 may perform the gear shift control as the oscillation reduction control both when the rotational oscillation decreases the rotation speed Nsec and when the rotational oscillation increases the rotation speed Nsec. For example, in this example, when the positive-negative reversal of the rotational oscillation extraction component is performed at approximately the timing T6, and in the oscillation reduction control, when the rotational oscillation extraction component is reversed from positive to negative at approximately the timing T6, the transmission gear ratio IP may be further changed to the high side. Accordingly, the rotational oscillation can be restrained both when the rotational oscillation decreases the rotation speed Nsec and when the rotational oscillation increases the rotation speed Nsec in a series of oscillations, and thus the rotational oscillation can also be quickly attenuated.

Next, main functions and effects of the present embodiment will be described.

(1) In the present embodiment, the control device for the transmission TM provided with the variator VA including the primary pulley PRI, the secondary pulley SEC, and the belt BLT includes the transmission controller 12 that performs the gear shift control of changing the transmission gear ratio IP of the variator VA to the high side when the rotational oscillation occurs in the secondary pulley SEC as an example of the rotation member of the variator VA and then the rotational oscillation decreases the rotation speed Nsec of the secondary pulley SEC.

(2) In the present embodiment, the control device for the transmission TM provided with the variator VA including the primary pulley PRI, the secondary pulley SEC, and the belt BLT includes the transmission controller 12 that performs the gear shift control of changing the transmission gear ratio IP of the variator VA to the low side when the rotational oscillation occurs in the secondary pulley SEC as an example of the rotation member of the variator VA and then the rotational oscillation increases the rotation speed Nsec of the secondary pulley SEC.

According to these configurations, the transmission gear ratio IP of the variator VA is changed to the high side when the rotational oscillation decreases the rotation speed Nsec of the secondary pulley SEC, or the transmission gear ratio IP of the variator VA is changed to the low side when the rotational oscillation increases the rotation speed Nsec of the secondary pulley SEC. As a result, by restraining the decrease or the increase in the rotation speed Nsec by the inertia torque generated due to the gear shift of the variator VA, it is possible to restrain the rotational oscillation causing the longitudinal oscillation of the vehicle.

(3) The gear shift control according to the above (1) further includes changing the transmission gear ratio IP of the variator VA to the low side when the rotational oscillation occurs in the secondary pulley SEC and then the rotational oscillation increases the rotation speed Nsec of the secondary pulley SEC.

According to such a configuration, the variator VA can be gear-shifted to the low side or to the high side depending on the relation between the hydraulic pressure instruction start timing and the waveform of the rotational oscillation extraction component, and thus it is possible to quickly start the hydraulic pressure instruction and restrain the rotational oscillation. Further, according to such a configuration, the rotational oscillation is restrained both when the rotational oscillation decreases the rotation speed Nsec and when the rotational oscillation increases the rotation speed Nsec in the series of oscillations, and thus the rotational oscillation can also be quickly attenuated.

(4) In a case in which the frequency f of the rotation speed Nsec of the secondary pulley SEC, which varies depending on the rotational oscillation, is larger than the first predetermined frequency f1 and smaller than the second predetermined frequency f2, and the amplitude amount Asec thereof exceeds the predetermined amplitude amount Asec1, the transmission controller 12 performs the gear shift control of changing the transmission gear ratio IP of the variator VA to the low side after the rotational oscillation increases the rotation speed Nsec of the secondary pulley SEC and before the rotational oscillation decreases the rotation speed Nsec of the secondary pulley SEC.

According to such a configuration, the rotational oscillation can be appropriately detected and then restrained, and the rotational oscillation can be appropriately restrained by performing the gear shift control of changing the transmission gear ratio IP toward the low side when the rotational oscillation extraction component is positive.

(5) The rotation variance occurs due to a factor other than the variator VA in the powertrain PT. The gear shift control according to the present embodiment has a great significance in that the rotational oscillation causing the longitudinal oscillation of the vehicle can be restrained in such a case.

(6) In the present embodiment, the rotation member is the secondary pulley SEC. According to such a configuration, the rotational oscillation caused by twisting of the drive shaft can be appropriately detected and restrained.

(7) The transmission controller 12 calculates the instruction pressure correction value Ppri_i1 which is an instruction pressure correction value of the primary pressure Ppri and an instruction pressure correction value corresponding to the rotational oscillation, the primary pressure Ppri is a hydraulic pressure supplied to the primary pulley PRI. The transmission controller 12 performs the gear shift control by increasing the instruction pressure correction value Ppri_i1 as the vehicle speed VSP decreases.

According to such a configuration, the inertia torque can be increased by increasing the gear shift speed obtained according to the instruction pressure correction value Ppri_i1 as the vehicle speed VSP decreases. Therefore, even when the vehicle speed VSP is low, it is possible to restrain the rotational oscillation by generating a sufficient inertia torque against a restoring force from the twisting of the drive shaft.

(8) The transmission controller 12 performs the gear shift control by largely changing the transmission gear ratio IP as the amplitude amount Asec of the rotation speed Nsec of the secondary pulley SEC increases, the rotation speed Nsec of the secondary pulley SEC varies depending on the rotational oscillation. According to such a configuration, it is possible to appropriately restrain the rotational oscillation by increasing the inertia torque as the amplitude amount Asec increases.

(9) The transmission controller 12 performs the gear shift control by increasing the gear shift speed of the variator VA as the frequency f of the rotation speed Nsec of the secondary pulley SEC increases, the rotation speed Nsec of the secondary pulley SEC varies depending on the rotational oscillation. According to such a configuration, the phase of the primary pressure Ppri in which the instruction pressure correction value Ppri_i1 is reflected can be matched with the phase of the rotation speed Nsec that varies, and further the primary pressure Ppri can have an opposite phase to the rotation speed Nsec, and thus the rotational oscillation can be appropriately restrained.

(10) The transmission controller 12 performs the gear shift control when the vehicle speed VSP is lower than the predetermined vehicle speed VSP1. According to such a configuration, it is possible to appropriately reduce the deterioration of the ride comfort according to the vehicle speed VSP by restraining the rotational oscillation when the ride comfort can be deteriorated in light of the vehicle speed VSP.

(11) The transmission controller 12 performs the gear shift control when the accelerator opening APO is lower than the predetermined opening APO1. According to such a configuration, it is possible to appropriately reduce the deterioration of the ride comfort according to the accelerator opening APO by restraining the rotational oscillation when the ride comfort can be deteriorated in light of the accelerator opening APO.

(12) The transmission controller 12 performs the gear shift control when the transmission gear ratio IP of the variator VA is larger than the predetermined transmission gear ratio IP1. According to such a configuration, it is possible to appropriately reduce the deterioration of the ride comfort according to the transmission gear ratio IP by restraining the rotational oscillation when the ride comfort can be deteriorated in light of the transmission gear ratio IP.

(13) The transmission controller 12 performs the gear shift control when the oil temperature TOIL of the variator VA is higher than the predetermined oil temperature TOIL1. According to such a configuration, it is possible to appropriately reduce the deterioration of the ride comfort according to the oil temperature TOIL by restraining the rotational oscillation when the decrease or the increase in the rotation speed Nsec can be restrained by the inertia torque generated due to the gear shift of the variator VA in light of the oil temperature TOIL.

Although the embodiment of the present invention has been described above, the above embodiment merely exemplifies some of application examples of the present invention and does not intend to limit the technical scope of the present invention to the specific configurations of the above embodiment.

For example, in the above embodiment, the case in which the secondary pulley SEC constitutes the rotation member has been described. However, the rotation member may be constituted by the primary pulley PRI. In this case, for example, it is possible to appropriately detect and restrain the rotational oscillation generated due to a rapid increase and a rapid decrease in an output torque Tout of the variator VA according to the brake operation.

The present application claims a priority based on Japanese Patent Application No. 2022-044002 filed with the Japan Patent Office on Mar. 18, 2022, all the contents of which are hereby incorporated by reference.

DESCRIPTION OF REFERENCE SIGNS

12: transmission controller (controller, computer)
A: amplitude amount
BLT: belt
DW: drive wheel
ENG: engine
f: frequency
IP: transmission gear ratio
Ppri: primary pressure
Ppri_i1: instruction pressure correction value
Psec: secondary pressure
PRI: primary pulley (rotation member)
PT: powertrain (power transmission path)
SEC: secondary pulley (rotation member)
T/M: transmission
VA: variator

The invention claimed is:

1. A control device for a transmission provided with a continuously variable transmission mechanism including a primary pulley to which a drive force of a drive source mounted on a vehicle is input, a secondary pulley that transmits the drive force of the drive source to a drive wheel, and an endless annular member that is wound around the primary pulley and the secondary pulley, the control device comprising:

a controller configured to perform a gear shift control of changing a transmission gear ratio of the continuously variable transmission mechanism to a high side when rotational oscillation occurs in a rotation member of the continuously variable transmission mechanism and then the rotational oscillation decreases a rotation speed of the rotation member, wherein the controller performs the gear shift control when a vehicle speed is lower than a predetermined vehicle speed.

2. A control device for a transmission provided with a continuously variable transmission mechanism including a primary pulley to which a drive force of a drive source mounted on a vehicle is input, a secondary pulley that transmits the drive force of the drive source to a drive wheel, and an endless annular member that is wound around the primary pulley and the secondary pulley, the control device comprising:

a controller configured to perform a gear shift control of changing a transmission gear ratio of the continuously variable transmission mechanism to a low side when rotational oscillation occurs in a rotation member of the continuously variable transmission mechanism and then the rotational oscillation increases a rotation speed of the rotation member, wherein the controller performs the gear shift control when a vehicle speed is lower than a predetermined vehicle speed.

3. A control device for a transmission provided with a continuously variable transmission mechanism including a primary pulley to which a drive force of a drive source mounted on a vehicle is input, a secondary pulley that transmits the drive force of the drive source to a drive wheel, and an endless annular member that is wound around the primary pulley and the secondary pulley, the control device comprising:

a controller configured to perform a gear shift control of changing a transmission gear ratio of the continuously variable transmission mechanism to a low side when rotational oscillation occurs in a rotation member of the continuously variable transmission mechanism and then the rotational oscillation increases a rotation speed of the rotation member, wherein the controller performs the gear shift control when the transmission gear ratio of the continuously variable transmission mechanism is larger than a predetermined transmission gear ratio.

4. The control device for a transmission according to claim 1, wherein the gear shift control further includes changing the transmission gear ratio of the continuously variable transmission mechanism to a low side when the rotational oscillation occurs and then the rotational oscillation increases the rotation speed of the rotation member.

5. The control device for a transmission according to claim 2, wherein
in a case in which a frequency of the rotation speed of the rotation member, which varies depending on the rotational oscillation, is within a predetermined range and an amplitude amount thereof exceeds a predetermined amplitude amount, the controller performs the gear shift control of changing the transmission gear ratio of the continuously variable transmission mechanism to the low side after the rotational oscillation increases the rotation speed of the rotation member and before the rotational oscillation decreases the rotation speed of the rotation member.

6. The control device for a transmission according to claim 3, wherein
in a case in which a frequency of the rotation speed of the rotation member, which varies depending on the rotational oscillation, is within a predetermined range and an amplitude amount thereof exceeds a predetermined amplitude amount, the controller performs the gear shift control of changing the transmission gear ratio of the continuously variable transmission mechanism to the low side after the rotational oscillation increases the rotation speed of the rotation member and before the rotational oscillation decreases the rotation speed of the rotation member.

7. The control device for a transmission according to claim 2, wherein
the rotational oscillation occurs due to a factor other than the continuously variable transmission mechanism in a power transmission path connecting the drive source and the drive wheel via the transmission.

8. The control device for a transmission according to claim 2, wherein
the rotation member is the secondary pulley.

9. The control device for a transmission according to claim 1, wherein
the controller calculates an instruction pressure correction value of a hydraulic pressure to be supplied to the primary pulley, the instruction pressure correction value corresponding to the rotational oscillation, and
the controller performs the gear shift control by increasing the instruction pressure correction value as a vehicle speed decreases.

10. The control device for a transmission according to claim 2, wherein
the controller calculates an instruction pressure correction value of a hydraulic pressure to be supplied to the primary pulley, the instruction pressure correction value corresponding to the rotational oscillation, and
the controller performs the gear shift control by increasing the instruction pressure correction value as a vehicle speed decreases.

11. The control device for a transmission according to claim 3, wherein
the controller calculates an instruction pressure correction value of a hydraulic pressure to be supplied to the primary pulley, the instruction pressure correction value corresponding to the rotational oscillation, and
the controller performs the gear shift control by increasing the instruction pressure correction value as a vehicle speed decreases.

12. The control device for a transmission according to claim 2, wherein
the controller performs the gear shift control by largely changing the transmission gear ratio as the amplitude amount of the rotation speed of the rotation member increases, the rotation speed of the rotation member varying depending on the rotational oscillation.

13. The control device for a transmission according to claim 2, wherein
the controller performs the gear shift control by increasing a gear shift speed of the continuously variable transmission mechanism as the frequency of the rotation speed of the rotation member increases, the rotation speed of the rotation member varying depending on the rotational oscillation.

14. The control device for a transmission according to claim 1, wherein
the controller performs the gear shift control when an accelerator opening is lower than a predetermined opening.

15. The control device for a transmission according to claim 2, wherein
the controller performs the gear shift control when an accelerator opening is lower than a predetermined opening.

16. The control device for a transmission according to claim 3, wherein
the controller performs the gear shift control when an accelerator opening is lower than a predetermined opening.

17. The control device for a transmission according to claim 1, wherein
the controller performs the gear shift control when the transmission gear ratio of the continuously variable transmission mechanism is larger than a predetermined transmission gear ratio.

18. The control device for a transmission according to claim 2, wherein
the controller performs the gear shift control when the transmission gear ratio of the continuously variable transmission mechanism is larger than a predetermined transmission gear ratio.

19. The control device for a transmission according to claim 2, wherein
the controller performs the gear shift control when an oil temperature of the continuously variable transmission mechanism is higher than a predetermined oil temperature.

* * * * *